United States Patent
Ikeda et al.

(10) Patent No.: US 8,619,081 B2
(45) Date of Patent: Dec. 31, 2013

(54) IMAGE PROCESSING APPARATUS AND IMAGE PROCESSING METHOD

(75) Inventors: Atsushi Ikeda, Kawasaki (JP); Wataru Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 12/761,756

(22) Filed: Apr. 16, 2010

(65) Prior Publication Data

US 2010/0283784 A1 Nov. 11, 2010

(30) Foreign Application Priority Data

May 11, 2009 (JP) ................................. 2009-114977

(51) Int. Cl.
*G06T 15/10* (2011.01)
(52) U.S. Cl.
USPC ............................ 345/427; 345/648; 345/436
(58) Field of Classification Search
None
See application file for complete search history.

(56) References Cited

U.S. PATENT DOCUMENTS

| | | | |
|---|---|---|---|
| 7,324,660 B2 * | 1/2008 | Oosawa | 382/100 |
| 2007/0177818 A1 * | 8/2007 | Teshima et al. | 382/276 |

FOREIGN PATENT DOCUMENTS

| | | |
|---|---|---|
| JP | 8-263690 A | 10/1996 |
| JP | 2006-145419 A | 6/2006 |

OTHER PUBLICATIONS

Foley et al., "Computer Graphics: Principles and Practice", 2nd Ed, 1997.*
Foley et al. ("Computer Graphics: Principles and Practice", 2nd Ed, 1997, p. 213-217.*

* cited by examiner

*Primary Examiner* — Aaron M Richer
*Assistant Examiner* — Weiming He
(74) *Attorney, Agent, or Firm* — Fitzpatrick, Cella, Harper & Scinto

(57) ABSTRACT

A deformation information transformation OK/NG discrimination unit determines whether or not it is possible to achieve a transformation equivalent to three-dimensional deformation information by only two-dimensional affine transformation. If it is possible to achieve this transformation, a two-dimensional bitmap generation unit generates a processed two-dimensional graphics image by applying the two-dimensional affine transformation equivalent to the transformation indicated by the three-dimensional deformation information to a two-dimensional graphics image.

4 Claims, 7 Drawing Sheets

| INFORMATION TO BE ACQUIRED | |
|---|---|
| TWO-DIMENSIONAL GRAPHICS INFORMATION | SHAPES, COLORS, AND LAYOUT INFORMATION OF CIRCLE AND RECTANGLE ~401 |
| THREE-DIMENSIONAL DEFORMATION INFORMATION (THREE-DIMENSIONAL AFFINE TRANSFORMATION PARAMETERS) | $\begin{bmatrix} 1 & 0 & 0 & 0 \\ 0 & 1 & 0 & 0 \\ 0 & 0 & 1 & 0 \\ 0 & 0 & z & 1 \end{bmatrix}$ ~402 |
| PROJECTION INFORMATION | PLANE OF $z = 0$ ~403 |

IMAGE PROCESSING APPARATUS AND IMAGE PROCESSING METHOD

BACKGROUND OF THE INVENTION

1. Field of the Invention

The present invention relates to a technique for generating a two-dimensional graphics image.

2. Description of the Related Art

A case will be examined below wherein when a two-dimensional graphics rendering result is laid out on a three-dimensional space, a vision of the space from a certain point on this space is to be output to a plane such as a display. In this case, three-dimensional affine transformation has to be applied to a bitmap image obtained by rendering the two-dimensional graphics image to lay it out on the space, and perspective transformation has to be applied to project the image onto the plane. However, such three-dimensional deformation processing takes much time. In addition, since the three-dimensional deformation processing and perspective transformation processing are applied to the bitmap image, the image quality of the bitmap image deteriorates compared to that rendered as a two-dimensional graphics image. For this reason, the following conventional method has been proposed (see Japanese Patent Laid-Open No. 8-263690 (patent reference 1).

In the conventional method, both three-dimensional structure data and two-dimensional image data are stored. When the stored two-dimensional image data is usable, it is used without generating any two-dimensional image data from the three-dimensional structure data.

However, the conventional method executes a process including space layout by means of the three-dimensional deformation processing and projection processing onto the plane for a bitmap image obtained by rendering a two-dimensional graphics image. For this reason, the image quality of the output result drops compared to the direct rendering result of the two-dimensional graphics image. Also, the method of patent reference 1 cannot be applied when a relative relationship between a viewpoint and object has changed.

SUMMARY OF THE INVENTION

The present invention has been made in consideration of the aforementioned problems, and provides a technique for outputting a two-dimensional graphics image laid out on a three-dimensional virtual space as an image having higher quality.

According to the first aspect of the present invention, an image processing apparatus comprising: a unit which acquires operation information indicating tree-dimensional operation contents for a two-dimensional object on a three-dimensional space; a unit which acquires projection information used to project the two-dimensional object laid out on the three-dimensional space onto a projection plane; a determination unit which determines based on the operation information and the projection information whether or not it is possible to transform the operation contents into two-dimensional transformation processing for the two-dimensional object; a generation unit which generates, when the determination unit determines that it is possible to transform the operation contents into two-dimensional transformation processing, a transformed two-dimensional object by applying the transformation processing to the two-dimensional object; and a unit which outputs the transformed two-dimensional object.

According to the second aspect of the present invention, an image processing apparatus comprising: a unit which acquires operation information indicating tree-dimensional operation contents for a two-dimensional object on a three-dimensional space; a unit which acquires projection information used to project the two-dimensional object laid out on the three-dimensional space onto a projection plane; a unit which generates a transformed two-dimensional object by generating a matrix for two-dimensional transformation using the operation information and the projection information, and applying the two-dimensional transformation to the two-dimensional object using the generated matrix; and a unit which outputs the transformed two-dimensional object.

According to the third aspect of the present invention, an image processing method comprising: a step of acquiring operation information indicating tree-dimensional operation contents for a two-dimensional object on a three-dimensional space; a step of acquiring projection information used to project the two-dimensional object laid out on the three-dimensional space onto a projection plane; a determination step of determining based on the operation information and the projection information whether or not it is possible to transform the operation contents into two-dimensional transformation processing for the two-dimensional object; a generation step of generating, when it is determined in the determination step that it is possible to transform the operation contents into two-dimensional transformation processing, a transformed two-dimensional object by applying the transformation processing to the two-dimensional object; and a step of outputting the transformed two-dimensional object.

According to the fourth aspect of the present invention, an image processing method comprising: a step of acquiring operation information indicating tree-dimensional operation contents for a two-dimensional object on a three-dimensional space; a step of acquiring projection information used to project the two-dimensional object laid out on the three-dimensional space onto a projection plane; a step of generating a transformed two-dimensional object by generating a matrix for two-dimensional transformation using the operation information and the projection information, and applying the two-dimensional transformation to the two-dimensional object using the generated matrix; and a step of outputting the transformed two-dimensional object.

Further features of the present invention will become apparent from the following description of exemplary embodiments with reference to the attached drawings.

DESCRIPTION OF THE EMBODIMENTS

Embodiments of the present invention will be described hereinafter with reference to the accompanying drawings. Note that each of the embodiments to be described hereinafter is an example when the present invention is practiced, and is one of practical embodiments of the arrangement described in the scope of the claims.

First Embodiment

Figure 1:
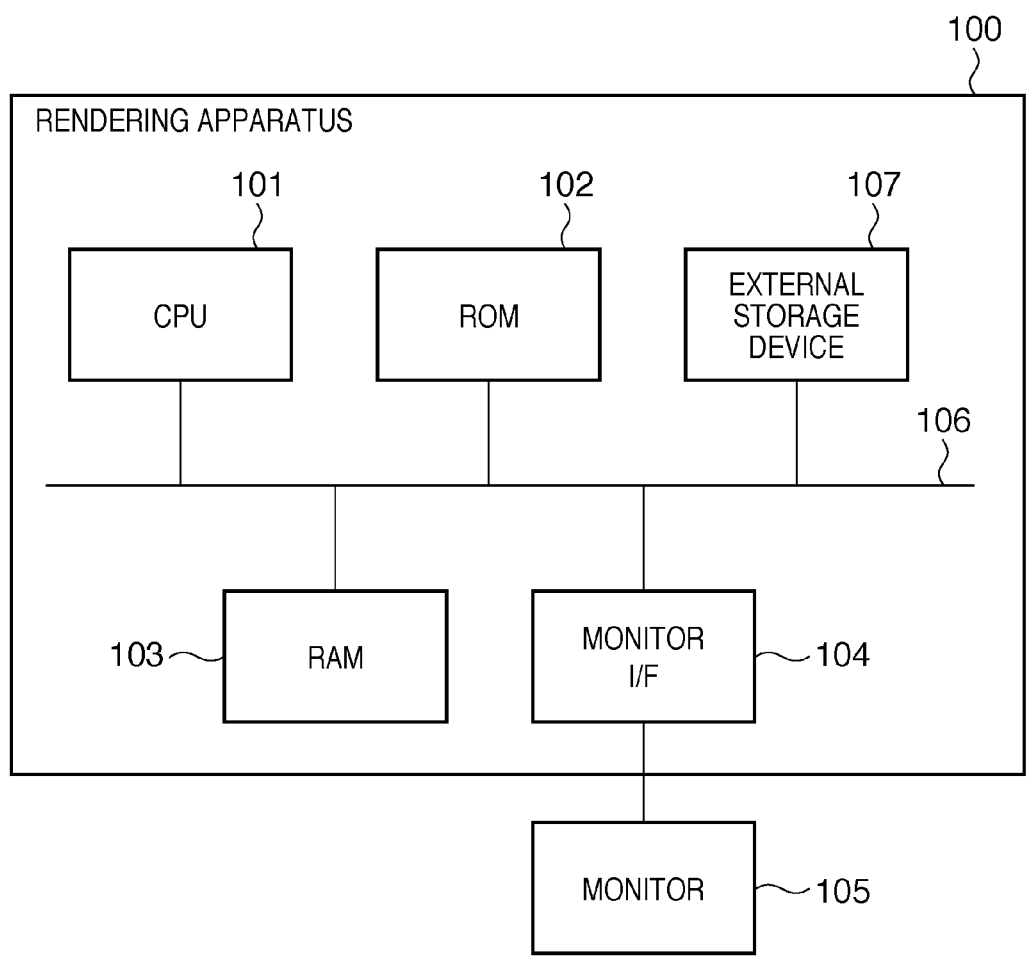
FIG. 1 is a block diagram showing an example of the hardware arrangement of a rendering apparatus 100.

FIG. 1 is a block diagram showing an example of the hardware arrangement of a rendering apparatus 100 as an image processing apparatus according to this embodiment. A CPU 101 controls the overall rendering apparatus 100 using computer programs and data stored in a ROM 102 and RAM 103, and executes respective processes to be described later as those which are to be implemented by the rendering apparatus 100.

The ROM 102 stores setting data, a boot program, and the like of the rendering apparatus 100. The RAM 103 has an area used to temporarily store computer programs and data loaded from an external storage device 107, and also a work area used when the CPU 101 executes various processes. That is, the RAM 103 can provide various areas as needed.

The external storage device 107 is a large-capacity storage device represented by a hard disk drive. The external storage device 107 saves an OS (Operating System), and computer programs and data required to make the CPU 101 execute various processes to be described later as those which are to be implemented by the rendering apparatus 100. Also, this external storage device 107 saves information handled as given information in the following description. The computer programs and data saved in the external storage device 107 are loaded as needed onto the RAM 103 under the control of the CPU 101, and are to be processed by the CPU 101.

A monitor I/F (interface) 104 serves as an interface required to connect a monitor 105 to the rendering apparatus 100. The processing result in the rendering apparatus 100 is output to the monitor 105 via this monitor I/F 104.

The monitor 105 includes a CRT or liquid crystal display, and can display the processing result of the CPU 101 by means of images, characters, and the like. Reference numeral 106 denotes a bus which interconnects the aforementioned units.

Note that FIG. 1 illustrates only components used in the following description, and the arrangement of an apparatus applicable to this embodiment is not limited to that shown in FIG. 1. For example, a keyboard and mouse used to input various instructions to the CPU 101 may be connected to the rendering apparatus 100. A network interface required to connect the rendering apparatus 100 to a network such as a LAN or the Internet may be arranged in the rendering apparatus 100. In this case, the rendering apparatus 100 may download various computer programs and data, which have been described as those saved in the external storage device 107, from an external apparatus connected to the network via the network interface.

Figure 2:
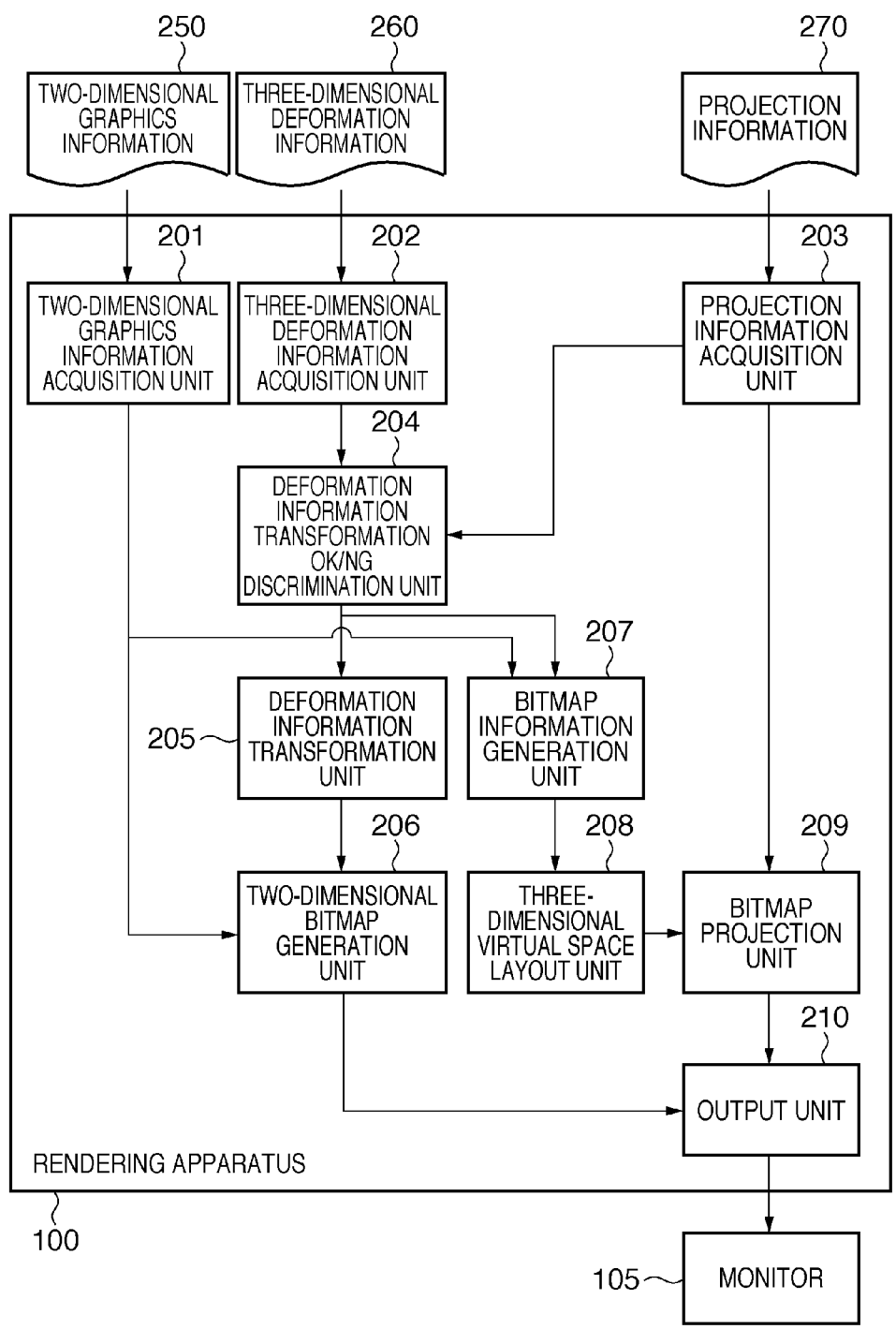
FIG. 2 is a block diagram showing an example of the functional arrangement of the rendering apparatus 100.

FIG. 2 is a block diagram showing an example of the functional arrangement of the rendering apparatus 100. A two-dimensional graphics information acquisition unit 201 acquires two-dimensional graphics information 250. For example, when the external storage device 107 saves this two-dimensional graphics information 250, the two-dimensional graphics information acquisition unit 201 acquires the two-dimensional graphics information 250 from the external storage device 107. As will be described in detail later, the two-dimensional graphics information 250 is a set of data which specify an object to be rendered on a two-dimensional plane. Using this set of data, a corresponding object can be rendered on the two-dimensional plane. One image configured by all pieces of information formed on the two-dimensional plane will be referred to as a two-dimensional graphics image hereinafter.

A three-dimensional deformation information acquisition unit 202 acquires three-dimensional deformation information (operation information) 260. For example, when the external storage device 107 saves this three-dimensional deformation information 260, the three-dimensional deformation information acquisition unit 202 acquires the three-dimensional deformation information 260 from the external storage device 107. As will be described in detail later, the three-dimensional deformation information 260 indicates the operation contents for a two-dimensional graphics image on a three-dimensional virtual space when the two-dimensional graphics image is laid out on the three-dimensional virtual space.

A projection information acquisition unit 203 acquires projection information 270. For example, when the external storage device 107 saves this projection information 270, the projection information acquisition unit 203 acquires the projection information 270 from the external storage device 107. As will be described in detail later, the projection information 270 is used to project a two-dimensional graphics image, which is laid out on the three-dimensional virtual space, onto a projection plane.

A deformation information transformation OK/NG discrimination unit 204 determines with reference to the three-dimensional deformation information 260 acquired by the three-dimensional deformation information acquisition unit 202 whether or not it is possible to achieve an operation equivalent to the operation contents indicated by this three-dimensional deformation information 260 by only two-dimensional affine transformation for a two-dimensional graphics image. In other words, the deformation information transformation OK/NG discrimination unit 204 determines whether or not it is possible to transform the three-dimensional deformation information 260 into two-dimensional deformation information indicating two-dimensional operation contents.

When it is determined that it is possible to achieve the operation equivalent to the operation contents indicated by the three-dimensional deformation information 260 by only two-dimensional affine transformation for a two-dimensional graphics image (case 1), a deformation information transformation unit 205 and two-dimensional bitmap generation unit 206 are activated. In other words, case 1 corresponds to that when it is determined that it is possible to transform the three-dimensional deformation information 260 into two-dimensional deformation information.

On the other hand, when it is determined that the operation equivalent to the operation contents indicated by the three-dimensional deformation information 260 cannot be achieved by only two-dimensional affine transformation for a two-dimensional graphics image (case 2), the following units are activated. That is, a bitmap information generation unit 207, a three-dimensional virtual space layout unit 208, the projection information acquisition unit 203, and a bitmap projection unit 209 are activated. In other words, case 2 corresponds to that when it is determined that it is impossible to transform the three-dimensional deformation information 260 into two-dimensional deformation information.

The deformation information transformation unit 205 transforms the three-dimensional deformation information 260 into two-dimensional deformation information. This transformation will be described in detail later. The two-dimensional bitmap generation unit 206 applies two-dimensional affine transformation to a two-dimensional graphics image indicated by the two-dimensional graphics information 250 using this two-dimensional deformation information. The two-dimensional bitmap generation unit 206 outputs the two-dimensional graphics image that has undergone the two-dimensional affine transformation as a processed two-dimensional graphics image to a subsequent output unit 210.

On the other hand, the bitmap information generation unit 207 generates a two-dimensional graphics image indicated by the two-dimensional graphics information 250. The three-dimensional virtual space layout unit 208 lays out the generated two-dimensional graphics image on a virtual space. At the time of the layout process, the three-dimensional virtual space layout unit 208 operates this two-dimensional graphics image according to the operation contents indicated by the three-dimensional deformation information 260.

The bitmap projection unit 209 projects the two-dimensional graphics image laid out by the operation of the three-dimensional virtual space layout unit 208 onto the projection plane according to the projection information 270, thereby forming the two-dimensional graphics image on this projection plane. The bitmap projection unit 209 outputs the two-dimensional graphics image formed on the projection plane as a processed two-dimensional graphics image to the subsequent output unit 210.

The output unit 210 outputs the processed two-dimensional graphics image output from one of the bitmap projection unit 209 and two-dimensional bitmap generation unit 206 to the monitor 105 via the monitor I/F 104.

Note while the respective units in the rendering apparatus 100 shown in FIG. 2 may be implemented by hardware, they are implemented by computer programs in the description of this embodiment. That is, the computer programs corresponding to these units are saved in the external storage device 107. These programs are loaded as needed on the RAM 103 under the control of the CPU 101, and are executed by the CPU 101. Thus, the CPU 101 can implement the functions of the respective units shown in FIG. 2.

Figure 3:
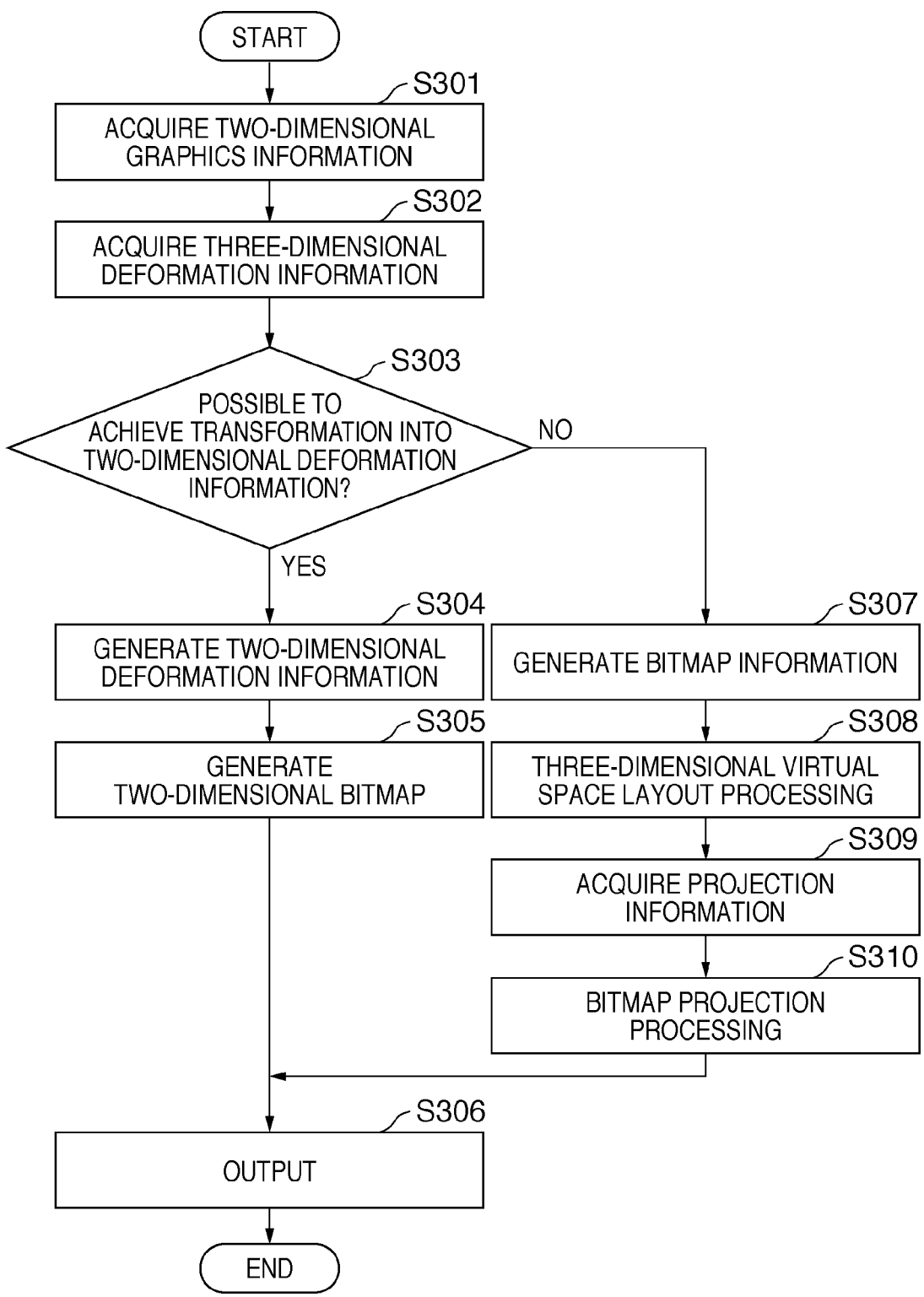
FIG. 3 is a flowchart of processing for generating a two-dimensional graphics image and outputting the image to a monitor 105.

FIG. 3 is a flowchart of processing executed when the rendering apparatus 100 generates one two-dimensional graphics image and outputs it to the monitor 105. Note that in the following description, main bodies that execute respective steps shown in FIG. 3 are the units shown in FIG. 2. However, since the respective units are implemented by the CPU 101 in this embodiment, the CPU 101 executes the respective steps in practice.

FIGS. 4A to 4D show examples of the two-dimensional graphics information 250, three-dimensional deformation information 260, and projection information 270 as those used in the processing of this embodiment, an example of a two-dimensional graphics image, and a virtual space obtained by processing using these pieces of information.

Therefore, the following description of the processing according to the flowchart shown in FIG. 3 uses FIGS. 4A to 4D as needed.

Figure 4A:
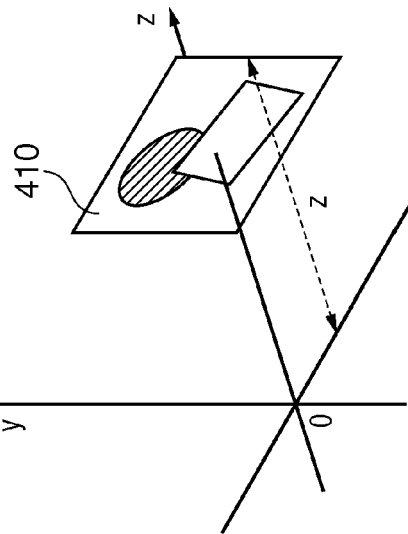
FIGS. 4A to 4D are views showing examples of two-dimensional graphics information 250, three-dimensional deformation information 260, projection information 270, and a two-dimensional graphics image, and a virtual space obtained by processing using these pieces of information.

In step S301, the two-dimensional graphics information acquisition unit 201 acquires the two-dimensional graphics information 250. FIG. 4A shows the two-dimensional graphics information 250, three-dimensional deformation information 260, and projection information 270 in a table format. A field 401 describes the two-dimensional graphics information 250. That is, the two-dimensional graphics information 250 holds sets of shapes, colors, and layout information for respective two-dimensional objects such as a circle and rectangle to be rendered on a two-dimensional graphics image.

Referring back to FIG. 3, the three-dimensional deformation information acquisition unit 202 acquires the three-dimensional deformation information 260 in step S302. A field 402 in FIG. 4A describes the three-dimensional deformation information 260. That is, the three-dimensional deformation information 260 specifies a layout position and rotation angles about respective axes of a two-dimensional graphics image when the two-dimensional graphics image is to be laid out on a three-dimensional virtual space, and is expressed as a matrix (parameters) for three-dimensional affine transformation. A three-dimensional affine transformation matrix described in the field 402 as an example is used to translate an image by "Z" in a z-axis direction.

Referring back to FIG. 3, the deformation information transformation OK/NG discrimination unit 204 refers to the three-dimensional deformation information 260 acquired by the three-dimensional deformation information acquisition unit 202 in step S303. Then, the unit 204 determines whether or not it is possible to achieve an operation equivalent to the operation contents indicated by this three-dimensional deformation information 260 by only two-dimensional affine transformation for a two-dimensional graphics image. In other words, the unit 204 determines whether or not it is possible to transform this three-dimensional deformation information 260 into two-dimensional deformation information indicating two-dimensional operation contents.

If a two-dimensional graphics image, which is laid out on a space by three-dimensional affine transformation, is parallel to the projection plane on which this two-dimensional graphics image is projected, an equivalent output result can be obtained even when appropriate two-dimensional affine transformation is applied to the two-dimensional graphics image. In order to allow the two-dimensional graphics image, which is laid out on the space by the three-dimensional affine transformation, to be parallel to the projection plane, rotation angles about the x- and y-axes (about prescribed axes) have to be 0° or 180°. Hence, whether or not it is possible to transform the three-dimensional deformation information 260 into two-dimensional deformation information is determined in step S303 by seeing whether or not the three-dimensional affine transformation matrix indicated by the three-dimensional deformation information 260 includes 0° or 180° as the rotation angles about the x- and y-axes.

Figure 6:
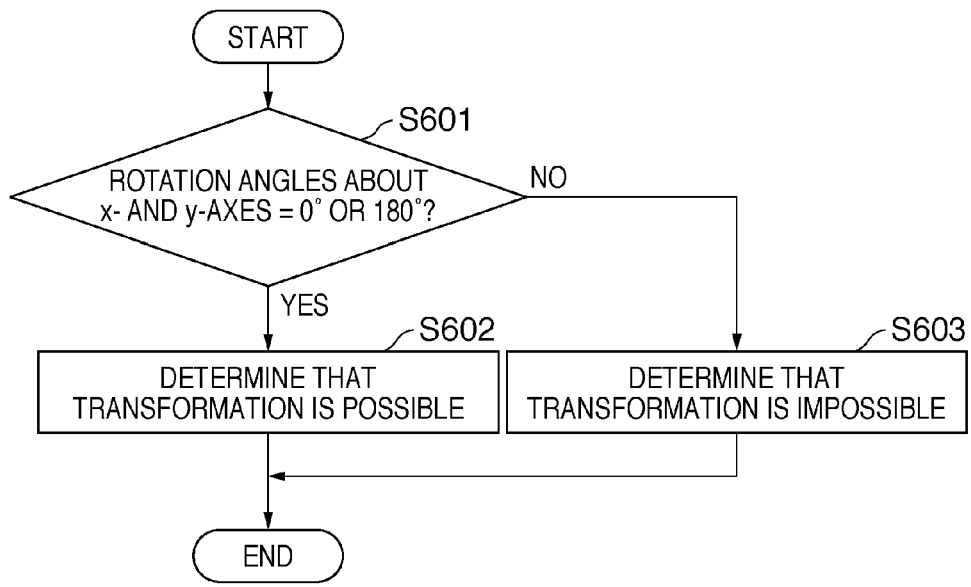
FIG. 6 is a flowchart showing details of the processing in step S303.

FIG. 6 is a flowchart showing details of the processing in step S303. The deformation information transformation OK/NG discrimination unit 204 determines in step S601 whether or not the three-dimensional affine transformation matrix indicated by the three-dimensional deformation information 260 includes 0° or 180° as the rotation angles about the x- and y-axes. More specifically, the unit 204 determines whether or not the three-dimensional affine transformation matrix indicated by the three-dimensional deformation information 260 has the following configuration:

$$\begin{pmatrix} a11 & a12 & 0 & 0 \\ a21 & a22 & 0 & 0 \\ 0 & 0 & a33 & 0 \\ X & Y & Z & 1 \end{pmatrix} \quad (1)$$

where a11, a12, a21, and a22 are components which combine rotation, shear, and enlargement/reduction on an x-y plane, and a33 is a component of enlargement/reduction in the z-axis direction. Also, X, Y, and Z are translation components.

As a result of determination, if the matrix includes 0° or 180°, the process advances to step S602. On the other hand, if the matrix does not include 0° or 180°, the process advances to step S603.

If the three-dimensional affine transformation matrix indicated by the three-dimensional deformation information 260 includes 0° or 180° as the rotation angles about the x- and y-axes, the shape of a two-dimensional graphics image remains unchanged even when two-dimensional affine transformation is applied to the two-dimensional graphics image. Therefore, in step S602 the deformation information transformation OK/NG discrimination unit 204 determines that it is possible to achieve the operation equivalent to the operation contents indicated by the three-dimensional deformation information 260 by only two-dimensional affine transformation for the two-dimensional graphics image. That is, the unit 204 determines that it is possible to transform the three-dimensional deformation information 260 into two-dimensional deformation information.

On the other hand, assume that a two-dimensional graphics image after the three-dimensional affine transformation is projected onto the projection plane when the three-dimensional affine transformation matrix indicated by the three-dimensional deformation information 260 does not include 0° or 180° as the rotation angles about the x- and y-axes. In this case, the shape of the two-dimensional graphics image on the projection plane has changed from an original shape. Therefore, in step S603 the deformation information transformation OK/NG discrimination unit 204 determines that the operation equivalent to the operation contents indicated by the three-dimensional deformation information 260 cannot be achieved by only two-dimensional affine transformation for a two-dimensional graphics image. That is, the unit 204 determines that it is impossible to transform the three-dimensional deformation information 260 into two-dimensional deformation information.

Referring back to FIG. 3, when the process advances from step S601 to step S602, the process advances from step S303 to step S304. On the other hand, when the process advances from step S601 to step S603, the process advances to step S303 to step S307.

In step S304, the deformation information transformation unit 205 transforms the three-dimensional deformation information 260 into two-dimensional deformation information. In this step, since the three-dimensional affine transformation matrix indicated by the three-dimensional deformation information 260 has the configuration given by matrix (1), the unit 205 transforms this matrix into two-dimensional deformation information given by:

$$\begin{pmatrix} a11 & a12 & 0 \\ a21 & a22 & 0 \\ X & Y & 1 \end{pmatrix} \quad (2)$$

Figure 4C:
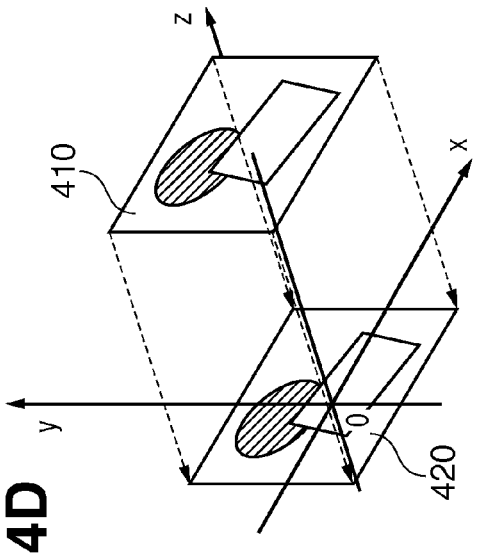
Figure 4B:
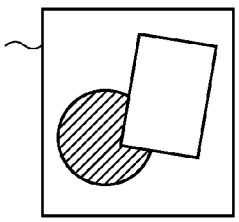

In step S305, the two-dimensional bitmap generation unit 206 applies two-dimensional affine transformation to the two-dimensional graphics image indicated by the two-dimensional graphics information 250 using this two-dimensional deformation information (first generation). Then, the two-dimensional bitmap generation unit 206 outputs the two-dimensional graphics image that has undergone the two-dimensional affine transformation as a processed two-dimensional graphics image to the subsequent output unit 210. FIG. 4B shows a two-dimensional graphics image 410 generated based on the two-dimensional graphics information 250 described in the field 401 in FIG. 4A.

On the other hand, the bitmap information generation unit 207 generates a two-dimensional graphics image indicated by the two-dimensional graphics information 250 in step S307. In step S308, the three-dimensional virtual space layout unit 208 lays out the generated two-dimensional graphics image on the virtual space. At the time of the layout process, the unit 208 moves and rotates this two-dimensional graphics image according to the operation contents indicated by the three-dimensional deformation information 260. FIG. 4C shows the two-dimensional graphics image 410 which is moved and rotated, and is laid out on the virtual space by the three-dimensional virtual space layout unit 208.

In step S309, the projection information acquisition unit 203 acquires the projection information 270. A field 403 in FIG. 4A shows an example of the projection information 270. In FIG. 4A, information required to project an image on a plane of z=0 is described as the projection information 270. Note that information used to project an object having an arbitrary shape laid out on the virtual space onto an arbitrary plane specified on the virtual space includes, for example, a projection matrix, and such technique is known to those who are skilled in the art as a perspective projection transformation technique. Therefore, no more explanation about the projection information 270 will be given.

Figure 4D:
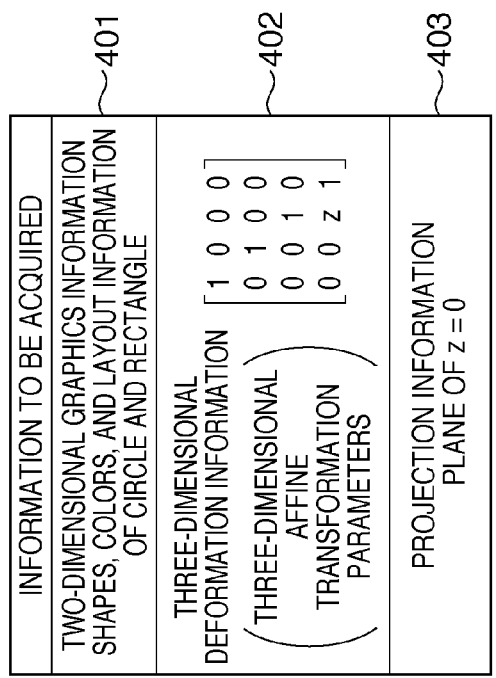

In step S310, the bitmap projection unit 209 projects the two-dimensional graphics image laid out by the three-dimensional virtual space layout unit 208 onto the projection plane according to the projection information 270, thereby forming the two-dimensional graphics image on this projection image (second generation). FIG. 4D shows a two-dimensional graphics image 420 which is formed on the projection plane when the two-dimensional graphics image 410 is projected onto the projection plane based on the projection information 270. Then, the bitmap projection unit 209 outputs the two-dimensional graphics image formed on this projection plane as a processed two-dimensional graphics image to the subsequent output unit 210.

In step S306, the output unit 210 outputs the processed two-dimensional graphics image output from one of the bitmap projection unit 209 and the two-dimensional bitmap generation unit 206 to the monitor 105 via the monitor I/F 104. In this embodiment, the output destination of the output unit 210 is the monitor 105. However, the output destination is not particularly limited. For example, the output destination may be the external storage device 107.

Second Embodiment

This embodiment will explain a two-dimensional graphics image generation method when a two-dimensional graphics image is to be pasted on a square plane of those that configure a virtual object (having a three-dimensional shape) laid out on a virtual space.

Note that only differences between this embodiment and the first embodiment will be described below, and a description of the same part as in the first embodiment will not be repeated. More specifically, in this embodiment, a matrix for two-dimensional affine transformation is generated as two-dimensional deformation information using a three-dimensional affine transformation matrix and projection information 270 irrespective of the configuration of the three-dimensional affine transformation matrix. Therefore, a deformation information transformation OK/NG discrimination unit 204, bitmap information generation unit 207, three-dimensional virtual space layout unit 208, and bitmap projection unit 209 in FIG. 2 are not required, and a deformation information transformation unit 205 acquires the projection information 270 acquired by a projection information acquisition unit 203.

FIGS. 5A to 5D show examples of two-dimensional graphics information 250, three-dimensional deformation information 260, and the projection information 270 as those used in the processing of this embodiment, an example of a two-dimensional graphics image, and a virtual space obtained by processing using these pieces of information.

Figure 5A:
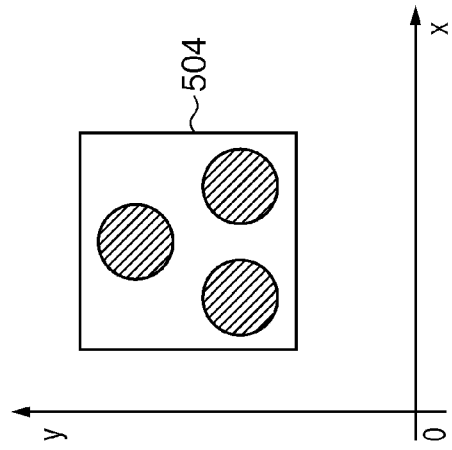
FIGS. 5A to 5D are views showing examples of the two-dimensional graphics information 250, three-dimensional deformation information 260, projection information 270, and two-dimensional graphics image, and a virtual space obtained by processing using these pieces of information.

FIG. 5A shows the two-dimensional graphics information 250, three-dimensional deformation information 260, and projection information 270 in a table format. A field 501 describes the two-dimensional graphics information 250. The two-dimensional graphics information 250 in this embodiment holds a set of a color and layout information of a circle as a two-dimensional object to be rendered on a two-dimensional plane.

Figure 5C:
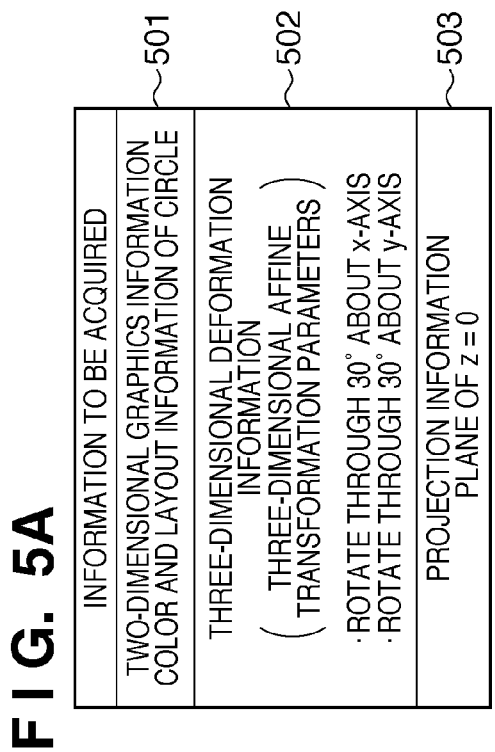
Figure 5B:
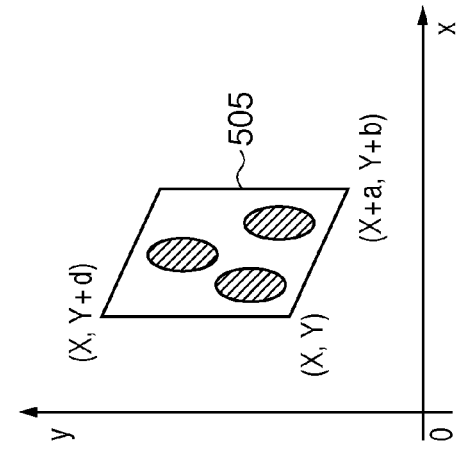

Referring to FIG. 5B, reference numeral 504 denotes a two-dimensional graphics image generated based on the two-dimensional graphics information 250 described in the field 501 shown in FIG. 5A. Reference numeral 505 denotes an image generated by applying two-dimensional affine transformation to this two-dimensional graphics image 504. Reference numeral 506 denotes an image obtained by projecting the image 505 onto a projection plane. A series of transformation processes including the two-dimensional affine transformation and projection can be implemented using a matrix given by:

$$\begin{pmatrix} a/d & b/d & 0 \\ 0 & 1 & 0 \\ X & Y & 1 \end{pmatrix} \quad (3)$$

That is, in this embodiment, two-dimensional deformation information as such matrix is generated using the three-dimensional deformation information 260 and projection information 270. That is, parameters a, d, and b in this matrix are decided based on the three-dimensional deformation information 260 and projection information 270. The subsequent processes are the same as those in the first embodiment.

A field 502 in FIG. 5A describes the three-dimensional deformation information 260. In this embodiment, the three-dimensional deformation information 260 expresses a three-dimensional affine transformation matrix which rotates an image through 30° about an x-axis and 30° about a y-axis, as shown in FIG. 5A.

Figure 5D:
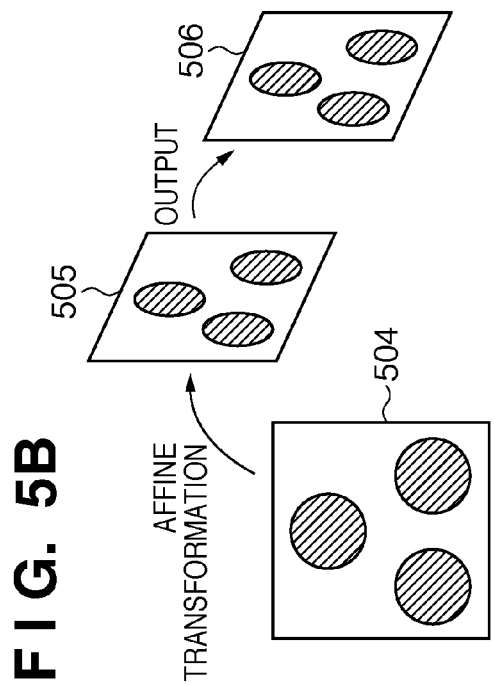

FIG. 5C shows the two-dimensional graphics image 504 on the two-dimensional plane. FIG. 5D shows the image 505. A field 503 in FIG. 5A shows an example of the projection information 270. In FIG. 5A, information required to project an image on a plane of z=0 is described as the projection information 270.

Third Embodiment

Figure 7:
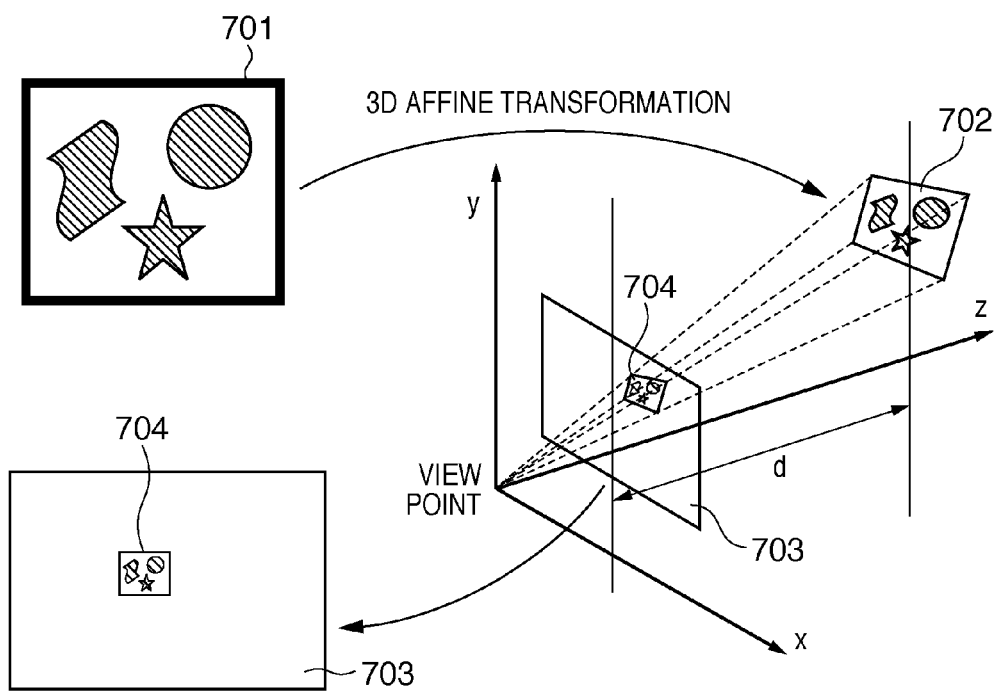
FIG. 7 is a view for explaining a mechanism for forming an image on a projection plane.

FIG. 7 is a view for explaining a mechanism for forming an image on a projection plane by laying out a two-dimensional graphics image on a virtual space by three-dimensional affine transformation and perspective-projecting the laid-out two-dimensional graphics image onto the projection plane.

Referring to FIG. 7, reference numeral 701 denotes a two-dimensional graphics image; and 702, a two-dimensional graphics image which is obtained by laying out this two-dimensional graphics image 701 on the virtual space by the three-dimensional affine transformation. A matrix used in this affine transformation has the configuration expressed by:

$$\begin{pmatrix} a11 & a12 & a13 & 0 \\ a21 & a22 & a23 & 0 \\ a31 & a32 & a33 & 0 \\ X & Y & Z & 1 \end{pmatrix} \quad (4)$$

Reference numeral 704 denotes an image obtained by performing perspective projection transformation of this two-dimensional graphics image 702 onto a projection plane 703, so as to generate an image viewed when this two-dimensional graphics image 702 is viewed from a viewpoint.

A case will be assumed below wherein a distance between the two-dimensional graphics image laid out on the virtual space by the three-dimensional affine transformation and the projection plane is sufficiently large, and the rotation angles about x- and y-axes of the two-dimensional graphics image are sufficiently small at the time of this layout process. In this case, image distortions caused by the perspective transformation is hard to be recognized.

In this embodiment, a determination criterion upon determining whether or not it is possible to transform three-dimensional deformation information 260 into two-dimensional deformation information is different from the first embodiment in consideration of the above case. Note that other processes are the same as those in the first embodiment.

Figure 8:
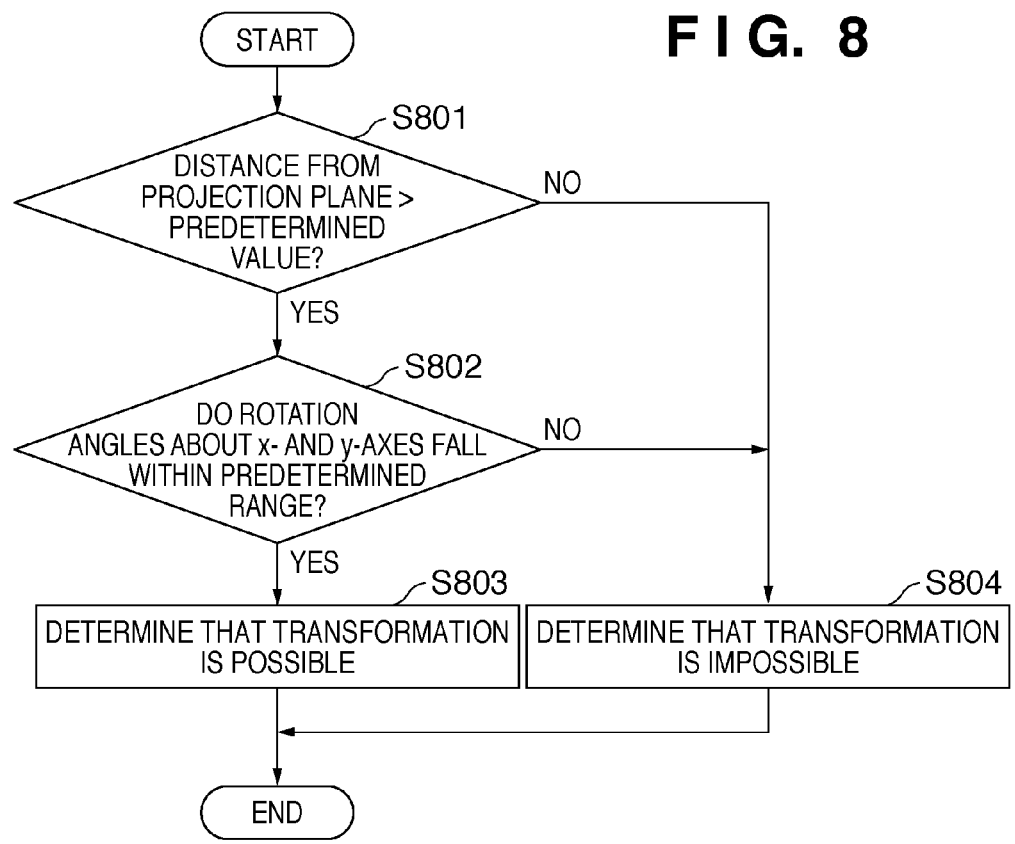
FIG. 8 is a flowchart showing details of the processing in step S303.

FIG. 8 is a flowchart showing details of the processing in step S303. In step S801, a deformation information transformation OK/NG discrimination unit 204 calculates a distance d between the layout position of a two-dimensional graphics image specified by the three-dimensional deformation information 260 and the projection plane, and determines whether or not the calculated distance d is larger than a threshold (predetermined value). As a result of determination, if the calculated distance d is larger than the threshold, the process advances to step S802; otherwise, the process advances to step S804.

The deformation information transformation OK/NG discrimination unit 204 determines in step S804 that an operation equivalent to the operation contents indicated by the three-dimensional deformation information 260 cannot be achieved by only two-dimensional affine transformation for a two-dimensional graphics image, as in step S603 above. That is, the unit 204 determines that it is impossible to transform the three-dimensional deformation information 260 into two-dimensional deformation information.

On the other hand, the deformation information transformation OK/NG discrimination unit 204 determines in step S802 whether or not rotation angles φ about the x- and y-axes specified by a three-dimensional affine transformation matrix indicated by the three-dimensional deformation information 260 fall within a predetermined range. More specifically, letting θ be a threshold which assumes a value close to zero, the unit 204 determines in step S802 whether or not (Condition 1) below is satisfied.

$$|\theta| > |\phi| \quad (-90 < \phi \leq 90) \quad \text{(Condition 1)}$$
$$|\theta| > |180 - \phi| \quad (90 < \phi \leq 270)$$

where a value that φ can assume falls within a range (−90<φ≤270).

Figure 9:
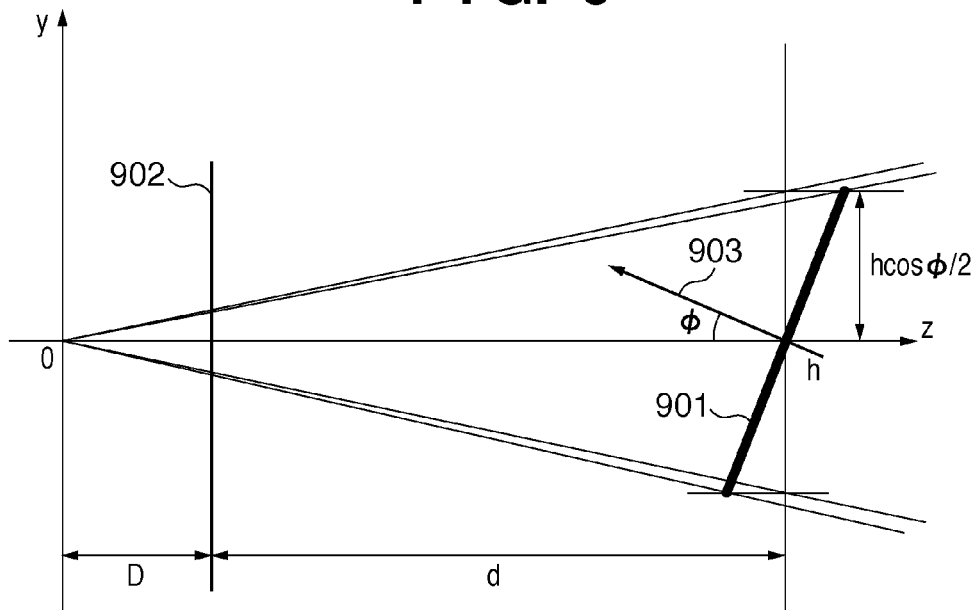
FIG. 9 is a view showing a virtual space when a two-dimensional graphics image 901 is viewed from a direction perpendicular to a y-z plane.

FIG. 9 is a view showing a virtual space when a two-dimensional graphics image 901 laid out on the virtual space by the three-dimensional affine transformation including translation and only rotation about the x-axis is viewed from a direction perpendicular to a y-z plane. Note that a direction perpendicular to the plane of paper agrees with the x-axis.

Assume that the two-dimensional graphics image 901 has a height h, a viewpoint is located at the position of an origin, and a projection plane 902 parallel to an x-y plane is located at a position separated from the origin by a distance D in the z-axis direction. A normal 903 is that to the two-dimensional graphics image 901. The two-dimensional graphics image 901 is laid out at a position separated by the distance d from the projection plane 902, and is rotated through the rotation angle φ about the x-axis. When the distance d is sufficiently large, and the angle φ satisfies (Condition 1) above, the two-dimensional graphics image 901 is laid out at a position z=D+d after its height is reduced to h cos φ. Thus, the two-dimensional graphics image 901 is approximated to an image which is laid out without any rotation in the x-axis direction.

A matrix for three-dimensional affine transformation including rotations about the x- and y-axes and translation is given by matrix (4) above. Letting D be the distance from the viewpoint to the projection plane, when the distance d between the two-dimensional graphics image and projection plane is sufficiently large and both the rotation angles φ about the x- and y-axes satisfy (Condition 1) above, a matrix for two-dimensional affine transformation to be approximated is given by:

$$\begin{pmatrix} a11 & a12 & 0 \\ a21 & a22 & 0 \\ X & Y & Z/D \end{pmatrix} \times \begin{pmatrix} \sqrt{1-a32^2} & 0 & 0 \\ 0 & \sqrt{1-a13^2} & 0 \\ 0 & 0 & 1 \end{pmatrix}$$

When such two-dimensional affine transformation is applied to a two-dimensional graphics image, a coordinate value (x, y) on this two-dimensional graphics image is transformed into a coordinate value (coordinate value after transformation) given by:

(D/Z×(a11x+a21y+X)×$\sqrt{1-a32^2}$, D/Z×(a12x+a22y+Y)×$\sqrt{1-a13^2}$)

Letting φ be a rotation angle about the x-axis, ψ be a rotation angle about the y-axis, and (D+d) be a translation component in the Z-direction (D is the distance from the viewpoint to the projection plane), the coordinate value after transformation is described by:

(D/(D+d)×(x cos ψ+y sin φ sin ψ+X)×$\sqrt{1-\sin^2\phi}$, D/D+d)×(y cos φ+Y)×$\sqrt{(1-\sin^2\psi)}$)

In this case, when the values φ and ψ are approximate to zero without limit, this coordinate value after transformation is described by:

(D/(D+d)×(x+X), D/(D+d)×(y+Y))

In this coordinate value after transformation, since x and y components become smaller with increasing d, errors due to approximation are also reduced. Hence, if (Condition 1) above is satisfied in step S802, the process advances to step S803; otherwise, the process advances to step S804.

In step S803, the deformation information transformation OK/NG discrimination unit 204 determines that it is possible to achieve the operation equivalent to the operation contents indicated by the three-dimensional deformation information 260 by only two-dimensional affine transformation for a two-dimensional graphics image. That is, the unit 204 determines that it is possible to transform the three-dimensional deformation information 260 into two-dimensional deformation information. Then, this two-dimensional deformation information is a matrix for the approximated two-dimensional affine transformation.

When the process advances to step S803, the process advances from step S303 to step S304. On the other hand, when the process advances to step S804, the process advances from step S303 to step S307.

According to the aforementioned embodiment, upon rendering a two-dimensional graphics image laid out on the virtual space, a case that can be processed by the two-dimensional affine transformation in place of the three-dimensional affine transformation can be detected. Then, in such case, since a two-dimensional graphics image can be rendered by the two-dimensional affine transformation, a high-quality image can be rendered, and the visibility can be enhanced. Also, in such case, the need for three-dimensional processing can be obviated, thus reducing the processing load.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-114977 filed May 11, 2009 which is hereby incorporated by reference herein in its entirety.

What is claimed is:

1. An image processing apparatus comprising:
    an acquisition unit which acquires three-dimensional deformation information indicating three-dimensional deformation of a two-dimensional object in a three-dimensional space;
    a determination unit which determines, based on the three-dimensional deformation information, whether or not it is possible to transform the three-dimensional deformation into two-dimensional deformation for the two-dimensional object;

a generation unit which generates, when said determination unit determines that it is possible to transform the three-dimensional deformation into the two-dimensional deformation, a transformed two-dimensional object by applying the two-dimensional deformation to the two-dimensional object; and a laying-out unit which utilizes, when said determination unit determines that it is impossible to transform the three-dimensional deformation into the two-dimensional deformation, the three-dimensional deformation information to lay-out the two-dimensional object on the three-dimensional space, wherein when a distance between a position of the projection plane and a layout position of the two-dimensional object indicated by the three-dimensional deformation information is larger than a threshold, and a rotation angle about a prescribed axis specified by the three-dimensional deformation information falls within a prescribed range, said determination unit determines that it is possible to achieve a deformation equivalent to the three-dimensional deformation indicated by the three-dimensional deformation information by only two-dimensional affine transformation for the two-dimensional object.

2. The apparatus according to claim 1, wherein when said determination unit determines that it is possible to transform the three-dimensional deformation into two-dimensional deformation, said generation unit applies the two-dimensional affine transformation to the two-dimensional object using three-dimensional deformation information when the rotation angle about the prescribed axis of the rotation angles about respective axes indicated by the information is approximate to zero.

3. An image processing method comprising:

an acquisition step of acquiring three-dimensional deformation information indicating three-dimensional for a two-dimensional object on a three-dimensional space;

a determination step, implemented by a processor, which determines, based on the three-dimensional deformation information, whether or not it is possible to transform the three-dimensional deformation into two-dimensional deformation for the two-dimensional object;

a generation step of generating, when it is determined in the determination step that it is possible to transform the three-dimensional deformation into two-dimensional deformation, a transformed two-dimensional object by applying the two-dimensional deformation to the two-dimensional object; and a laying-out step of utilizing, when said determination step determines that it is impossible to transform the three-dimensional deformation into the two-dimensional deformation, the three-dimensional deformation information to lay-out the two-dimensional object on the three-dimensional space, wherein when a distance between a position of the projection plane and a layout position of the two-dimensional object indicated by the three-dimensional deformation information is larger than a threshold, and a rotation angle about a prescribed axis specified by the three-dimensional deformation information falls within a prescribed range, said determination step determines that it is possible to achieve a deformation equivalent to the three-dimensional deformation indicated by the three-dimensional deformation information by only two-dimensional affine transformation for the two-dimensional object.

4. The method according to claim 3, wherein when said determination step determines that it is possible to transform the three-dimensional deformation into two-dimensional deformation, said generation step applies the two-dimensional affine transformation to the two-dimensional object using three-dimensional deformation information when the rotation angle about the prescribed axis of the rotation angles about respective axes indicated by the information is approximate to zero.

* * * * *